United States Patent
Wofford, IV et al.

(10) Patent No.: US 9,201,610 B2
(45) Date of Patent: Dec. 1, 2015

(54) CLOUD-BASED STORAGE DEPROVISIONING

(75) Inventors: William James Wofford, IV, Colorado Springs, CO (US); Jon McRay, Silver Spring, MD (US); James Michael Muell, Tracys Landing, MD (US); Shanlu Wu, Rockville, MD (US); Lee Jason Smith, Land O Lakes, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 13/273,327

(22) Filed: Oct. 14, 2011

(65) Prior Publication Data

US 2013/0097275 A1   Apr. 18, 2013

(51) Int. Cl.
  G06F 15/167   (2006.01)
  G06F 17/30    (2006.01)
  G06F 3/06     (2006.01)

(52) U.S. Cl.
  CPC ............ G06F 3/0652 (2013.01); G06F 3/0605 (2013.01); G06F 3/067 (2013.01); G06F 17/30557 (2013.01); G06F 3/0622 (2013.01)

(58) Field of Classification Search
  CPC ............ G06F 17/30067; G06F 17/301; G06F 17/30156; G06F 17/30265; G06F 17/30486; G06F 3/0605; G06F 3/067; G06F 9/466; H04L 29/00; H04L 67/1023; H04L 67/1097
  USPC ............ 705/1.1, 28, 80; 707/785, 999–999.2, 707/E17.01, 622–812; 709/202–238; 711/118, E12.01, 113–114, 151–152
  See application file for complete search history.

(56) References Cited

U.S. PATENT DOCUMENTS

| | | | |
|---|---|---|---|
| 6,470,420 B1* | 10/2002 | Hospodor | 711/114 |
| 6,598,041 B1* | 7/2003 | Bernal et al. | 1/1 |
| 6,704,885 B1* | 3/2004 | Salas-Meza et al. | 714/6.3 |
| 7,313,581 B1* | 12/2007 | Bachmann et al. | 707/759 |
| 7,698,334 B2* | 4/2010 | Kazar et al. | 707/737 |
| 8,595,237 B1* | 11/2013 | Chaudhary et al. | 707/741 |
| 8,600,998 B1* | 12/2013 | Chaudhary et al. | 707/741 |
| 8,650,159 B1* | 2/2014 | Zhang et al. | 707/664 |
| 2003/0110278 A1* | 6/2003 | Anderson | 709/231 |
| 2006/0031201 A1* | 2/2006 | Adams et al. | 707/3 |
| 2008/0244596 A1* | 10/2008 | Mansker et al. | 718/104 |
| 2008/0303833 A1* | 12/2008 | Swift et al. | 345/505 |
| 2010/0332401 A1* | 12/2010 | Prahlad et al. | 705/80 |
| 2011/0106855 A1* | 5/2011 | Resch et al. | 707/793 |
| 2011/0137962 A1* | 6/2011 | McKenney et al. | 707/818 |
| 2012/0030437 A1* | 2/2012 | Resch et al. | 711/156 |
| 2012/0042130 A1* | 2/2012 | Peapell | 711/126 |
| 2012/0233134 A1* | 9/2012 | Barton et al. | 707/692 |
| 2013/0024421 A1* | 1/2013 | Shinohara | 707/622 |
| 2013/0024426 A1* | 1/2013 | Flowers et al. | 707/654 |
| 2013/0097275 A1* | 4/2013 | Wofford et al. | 709/213 |
| 2013/0185229 A1* | 7/2013 | Naga et al. | 705/418 |
| 2013/0226882 A1* | 8/2013 | Jaiswal et al. | 707/692 |
| 2014/0245016 A1* | 8/2014 | Desai et al. | 713/171 |
| 2014/0245026 A1* | 8/2014 | Bates | 713/190 |

* cited by examiner

Primary Examiner — Wing F Chan
Assistant Examiner — Raji Krishnan

(57) ABSTRACT

A device creates a first cloud storage container in a first region of cloud storage, clears a delete flag associated with the first cloud storage container, and stores a first data object in the first cloud storage container in the first region of cloud storage. The device receives a request to delete the first cloud storage container, sets a delete flag associated with the first cloud storage container based on the request to delete the first cloud storage container, and deletes the first cloud storage container if the request to delete has not been rescinded prior to expiration of a time period.

18 Claims, 15 Drawing Sheets

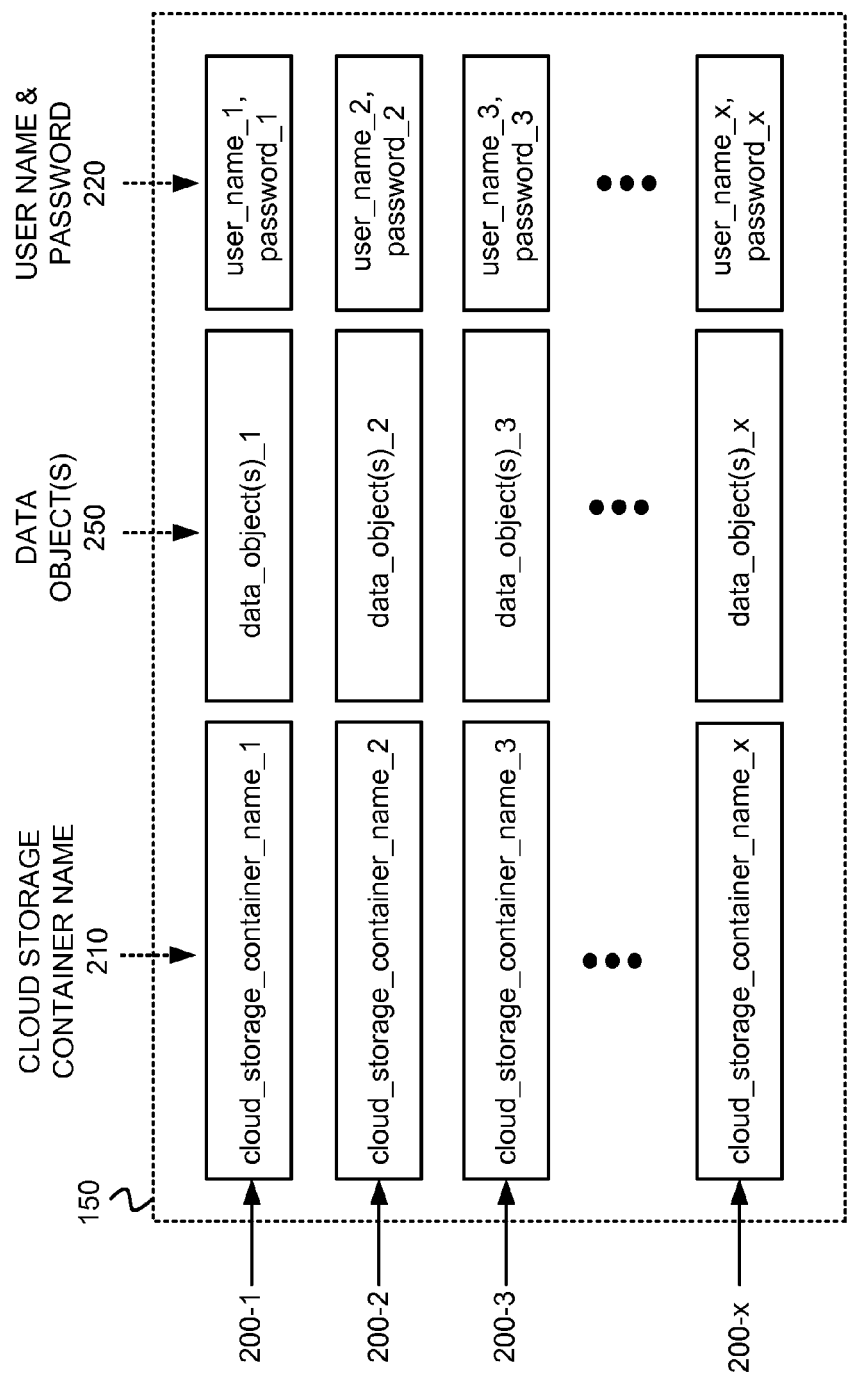

CLOUD-BASED STORAGE DEPROVISIONING

BACKGROUND

Cloud storage includes networked on-line storage where multiple virtual servers are used to store data. Operators of physical data centers virtualize their data storage resources and expose those virtualized resources to cloud storage customers as storage pools. The physical data centers may span multiple servers across multiple regions in the Internet. The use of cloud storage by customers enables the customers to offload storage maintenance tasks to the cloud storage service providers, thus, reducing information technology (IT) and data storage hosting costs.

BRIEF DESCRIPTION OF THE DRAWINGS

FIG. 2B is a diagram that illustrates the storage of cloud storage containers at the cloud storage platforms of FIGS. 1A and 1B;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1A:
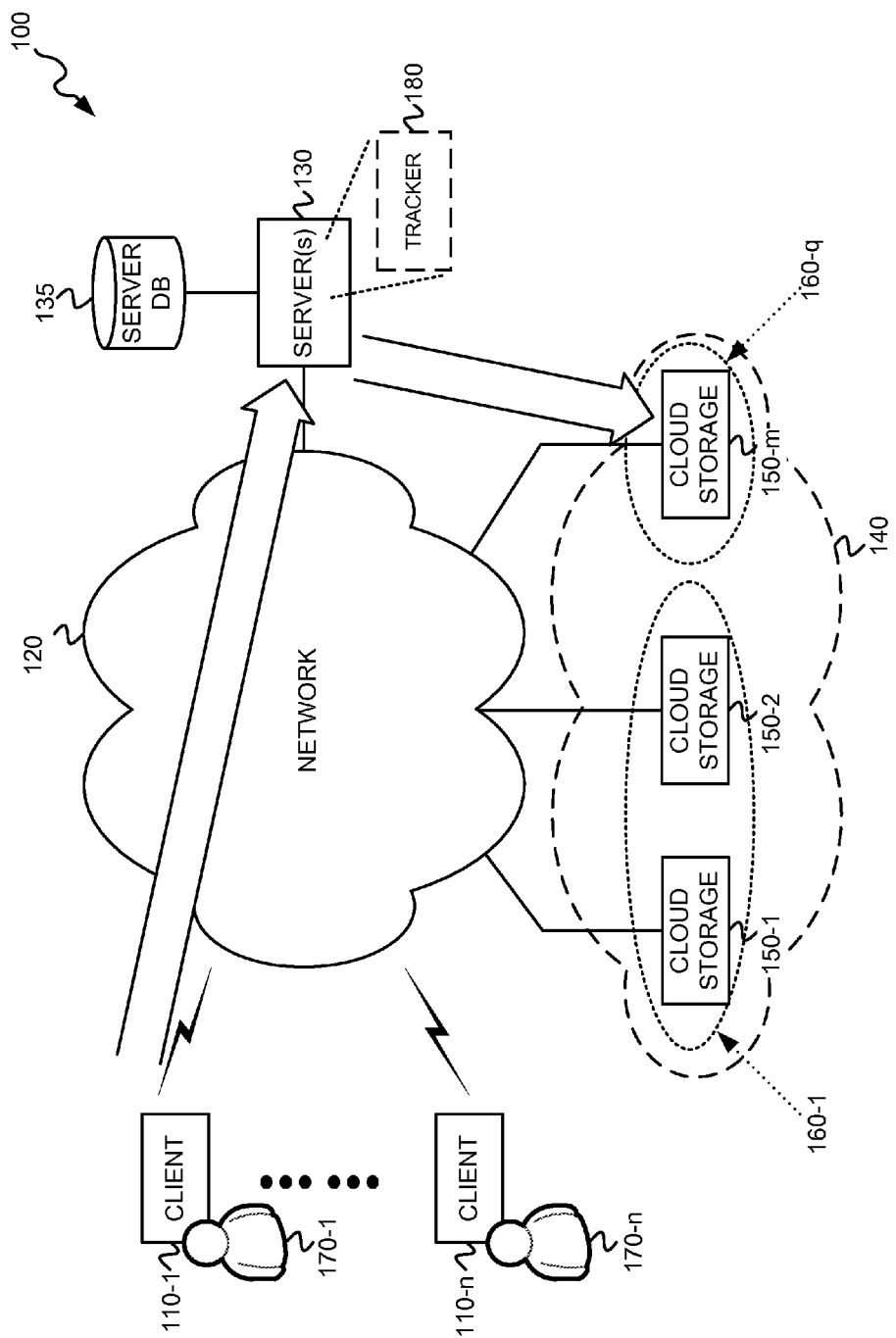
FIGS. 1A and 1B are diagrams that depict an exemplary network environment in which cloud-based storage may be implemented.

FIG. 1A illustrates an exemplary network environment 100 in which cloud-based storage may be implemented. Network environment 100 may include multiple clients 110-1 through 110-$n$ (with n being any integer greater than or equal to one), a network 120, a server(s) 130, a server database (DB) 135, and cloud storage 140. Cloud storage 140 may include multiple cloud storage platforms 150-1 through 150-$m$ (with m being any integer greater than or equal to two), with each of cloud storage platforms 150-1 through 150-$m$ residing in a specific one of multiple regions 160-1 through 160-$q$ (with q being any integer greater than or equal to two). The multiple regions may include different geographic regions within network 120 (e.g., North America, Europe, Asia, etc.). Clients 110-1 through 110-$n$ (generically referred to herein as "client 110"), and server 130, may connect with network 120 via wired or wireless links.

Each client 110-1 through 110-$n$ may be associated with a respective cloud storage customer 170-1 through 170-$n$ (generically referred to herein as "customer 170") that uses client 110 to create cloud storage containers, store data in the created cloud storage containers, access the stored data, and delete the cloud storage containers, from cloud storage 140. Client 110 may include, for example, a telephone (e.g., smart phone); a laptop, desktop, palmtop or tablet computer; a personal digital assistant (PDA), or other type of digital computing device that may communicate with server 130 and/or cloud storage 140 via network 120.

Server(s) 130 may include one or more servers or computing devices that may act as a "go-between" between clients 110-1 through 110-$n$ and cloud storage 140. In some implementations, clients 110-1 through 110-$n$ may access cloud storage 140 via server(s) 130. In other implementations, clients 110-1 through 110-$n$ may access cloud storage 140 directly. Server DB 135 may include a data structure (e.g., a database) that stores information related to cloud storage containers, such as, for example, a name, a user name and a password associated with each cloud storage container. The data structure may additionally store a delete flag and delete flag time in association with a name of each cloud storage container. The delete flag may indicate (e.g., when set) that the customer of a respective cloud storage container has requested that the cloud storage container be deleted. The delete flag time may indicate a time and date when the respective cloud storage container was requested to be deleted. Server 130 may implement a tracker 180 which tracks delete flags, and corresponding delete flag times, stored at server DB 135, and deletes cloud storage containers from cloud storage platforms 150-1 through 150-$m$ when delete flag times exceed a configurable grace period. Tracker 180 may, for example, be implemented as a software process by server 130.

Cloud storage platforms 150-1 through 150-$m$ (generically referred to herein as "cloud storage platform 150") may each include a server or computing device that includes storage capacity for use in cloud storage 140. Cloud storage platforms 150-1 through 150-$m$ may store cloud storage containers, data objects, delete flags, and possibly other data for access by one or more of customers 170-1 through 170-$n$.

Network 120 may include one or more networks of various types. For example, network 120 may include a cable network (e.g., an optical cable network), a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, and/or the Internet.

Figure 1B:
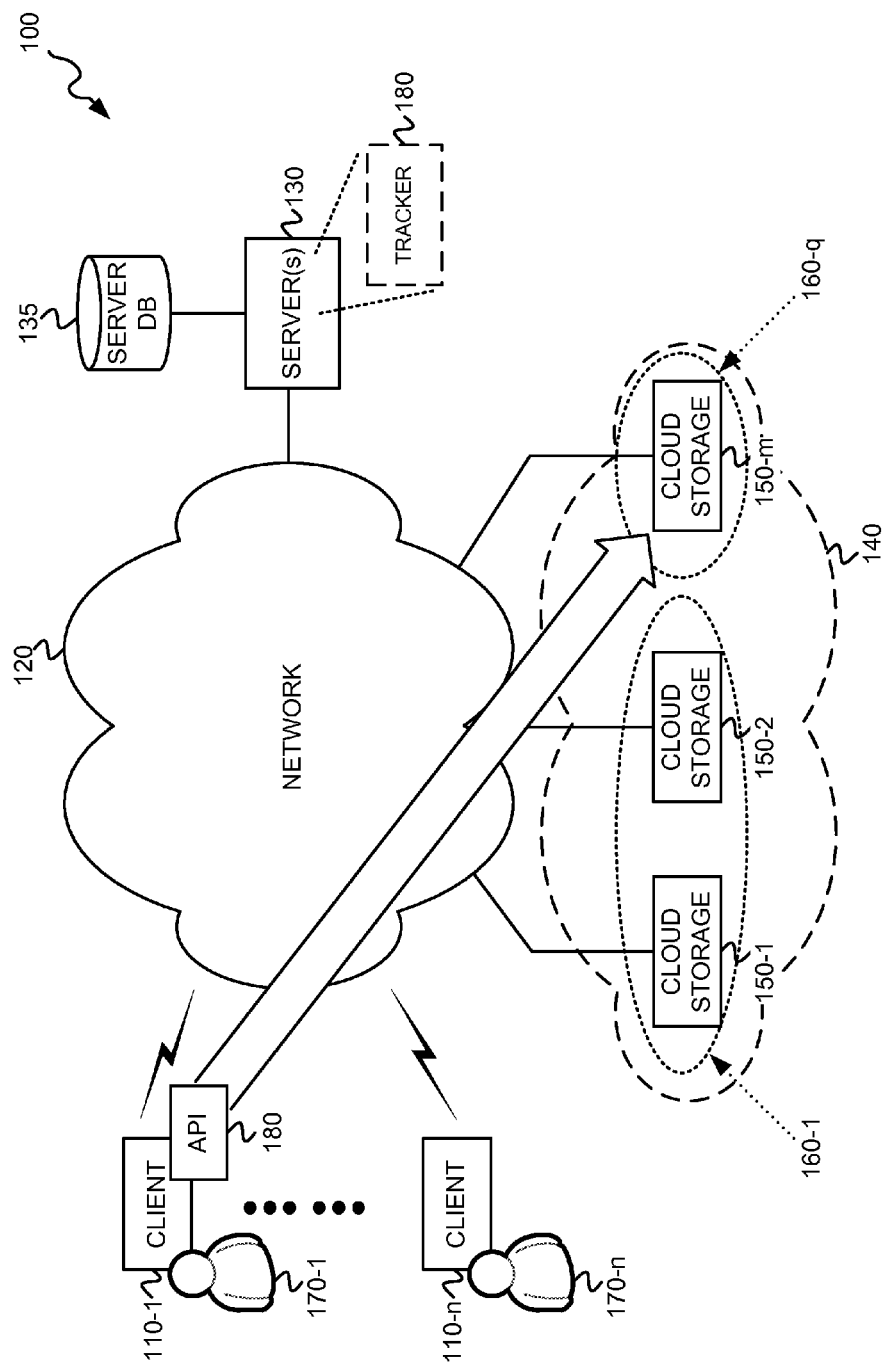

FIG. 1A depicts one exemplary implementation in which clients 110-1 through 110-$n$ access cloud storage 140 (cloud storage platform 150-$m$ shown in FIG. 1A by way of example) via server 130. FIG. 1B depicts another exemplary implementation in which one or more of clients 110-1 through 110-$n$ include their own Application Programming Interface (API) for communicating directly with cloud storage 140. FIG. 1B depicts client 110-1 using an API 180 for directly accessing cloud storage 150-$m$ (i.e., not accessing via server 130).

The configuration of network components of network environment 100 illustrated in FIGS. 1A and 1B is for illustrative purposes. Other configurations may be implemented. Therefore, network environment 100 may include additional, fewer and/or different components than those depicted in FIGS. 1A and 1B.

Figure 2A:
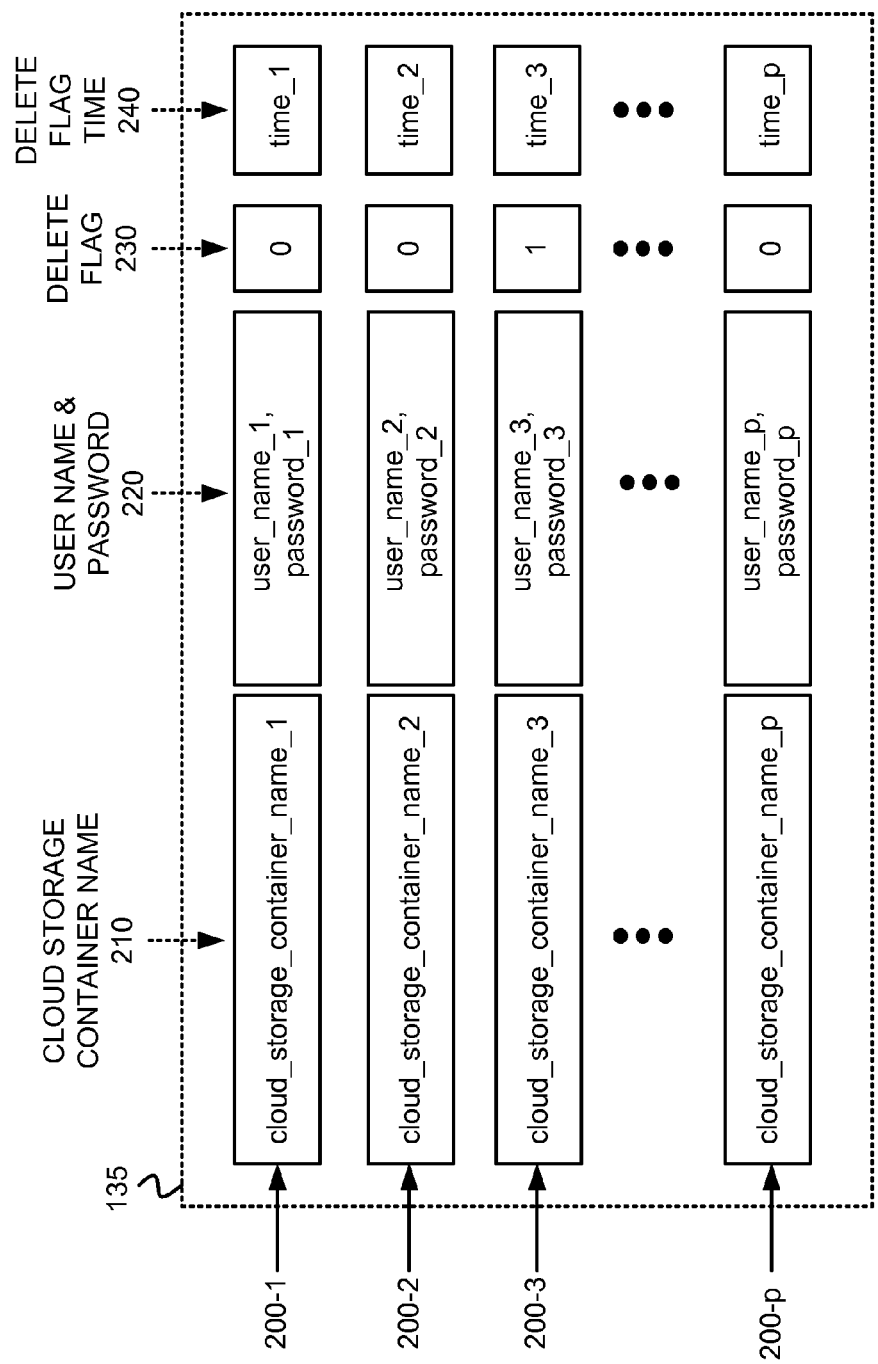
FIG. 2A is a diagram that illustrates a data structure associated with data stored at the server database of FIGS. 1A and 1B.

FIG. 2A is a diagram that illustrates a data structure associated with data stored at server DB 135. Server DB 135 may store multiple entries 200-1 through 200-$p$, with each entry being associated with a specific cloud storage container. As shown in FIG. 2A, each entry 200 may include a cloud storage container name field 210, a user name and password field 220, a delete flag field 230 and a delete flag time field 240. Cloud storage container name field 210 may store the customer-selected name of a cloud storage container. User name and password field 220 may store a user name and password associated with the cloud storage container named in field 210. The user name and password may permit access to a data object(s) stored in the cloud storage container named in field 210. Delete flag field 230 may store a bit that is either set (e.g., bit=1) or cleared (e.g., bit=0) to indicate whether a customer has requested that the cloud storage container named in field 210 be deleted. Delete flag time 240 may store a date and time that indicates the date and time when the delete flag was marked for deletion. Other data fields, now shown in FIG. 2A, may be stored in the data structure of server DB 135.

FIG. 2B is a diagram that illustrates the storage of cloud storage containers at cloud storage platform 150. As shown in FIG. 2, cloud storage platform 150 may store multiple cloud storage containers 200-1 through 200-$x$ (where p is an integer greater than or equal to one), with each one of cloud storage containers 200-1 through 200-$x$ being associated with a respective cloud storage container name 210, a data object(s) 250, and a user name and password 220. Data object(s) 250 may store one or more data objects, where each data object may include any type or format of data that may be stored in cloud storage 140 for access and retrieval by a client 110. Other data, now shown in FIG. 2, may be stored in association with each cloud storage container.

Figure 3:
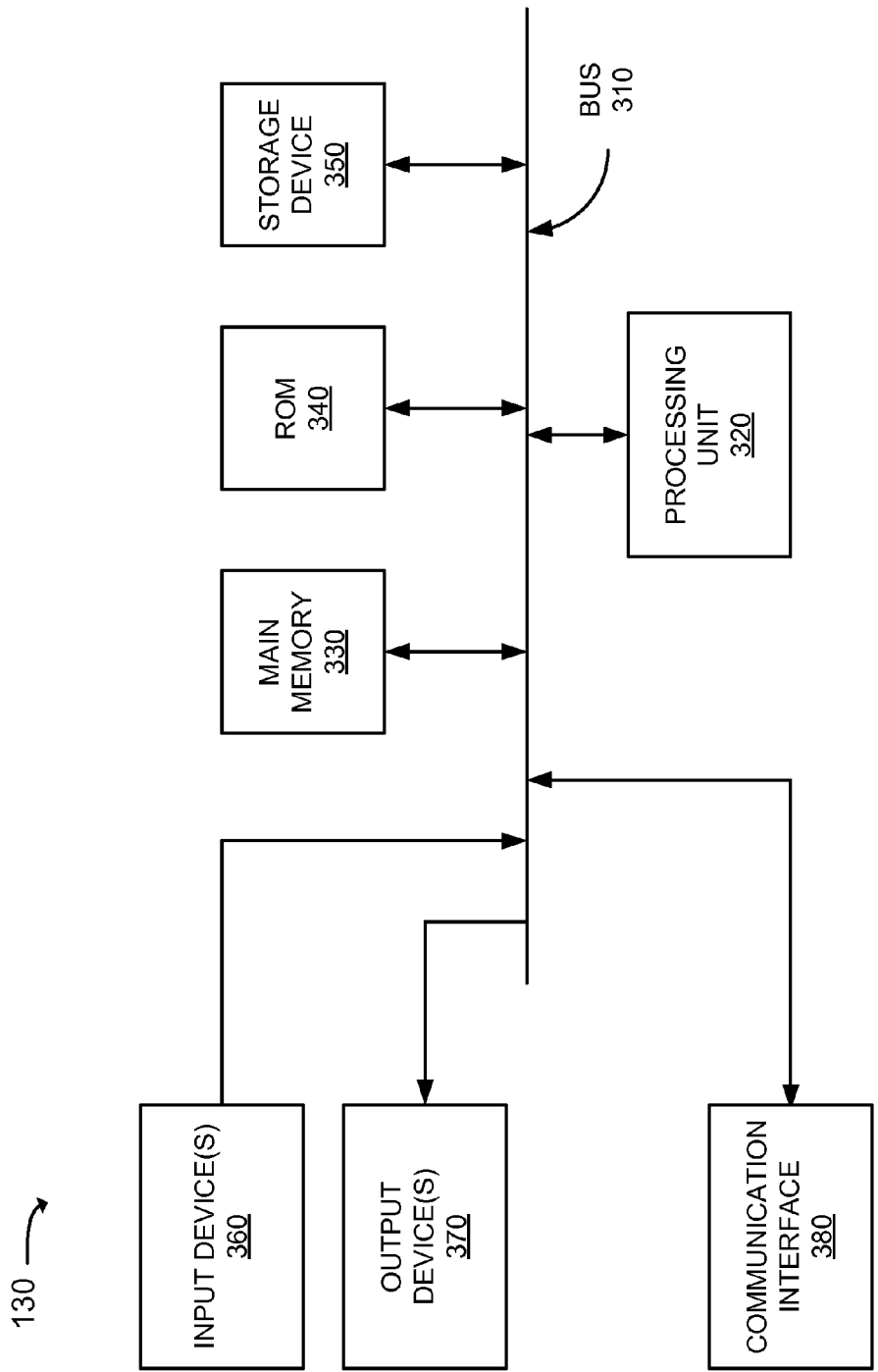
FIG. 3 is a diagram that depicts exemplary components of the server of FIGS. 1A and 1B.

FIG. 3 is a diagram that depicts exemplary components of server 130. Clients 110-1 through 110-1, server DB 135, and cloud storage platforms 150-1 through 150-$m$ may be similarly configured. Server 130 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the elements of server 130.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium.

Input device 360 may include one or more mechanisms that permit an operator to input information to server 130, such as, for example, a keypad or a keyboard, a display with a touch sensitive panel, voice recognition and/or biometric mechanisms, etc. Output device 370 may include one or more mechanisms that output information to the operator, including a display, a speaker, etc. Communication interface(s) 380 may include a transceiver that enables server 130 to communicate with other devices and/or systems. For example, communication interface(s) 380 may include wired or wireless transceivers for communicating via network 120.

The configuration of components of server 130 illustrated in FIG. 3 is for illustrative purposes. Other configurations may be implemented. Therefore, server 130 may include additional, fewer and/or different components than those depicted in FIG. 3.

Figure 4:
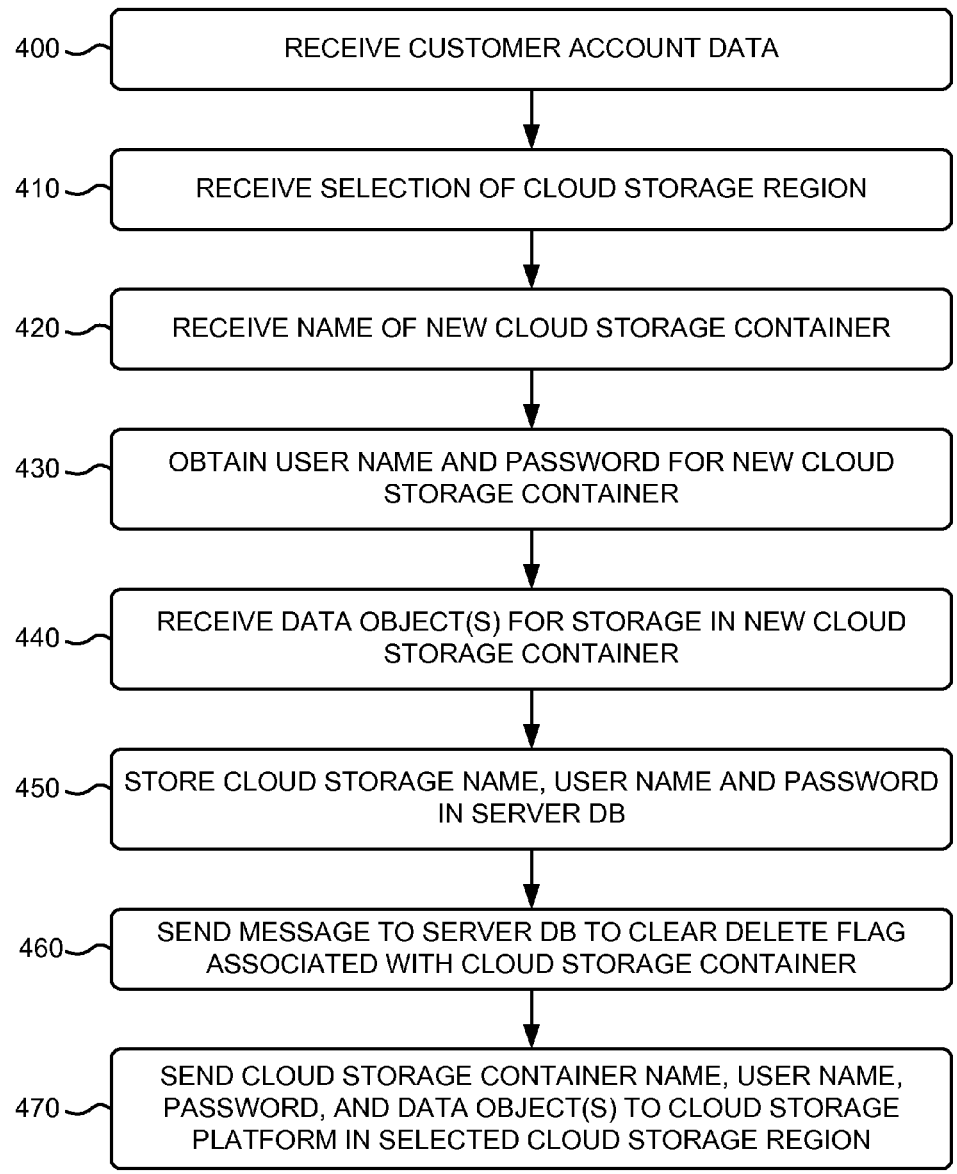
FIG. 4 is a flow diagram that illustrates an exemplary process for creating a cloud storage container in a customer selected cloud storage region.

FIG. 4 is a flow diagram that illustrates an exemplary process for creating a cloud storage container in a customer selected cloud storage region. The exemplary process of FIG. 4 may be implemented by server 130, in conjunction with server DB 135 and cloud storage platforms 150-1 through 150-$m$. The exemplary process of FIG. 4 is described below with reference to the exemplary messaging diagram of FIG. 5 and the exemplary user interface of FIG. 6.

Figure 5:
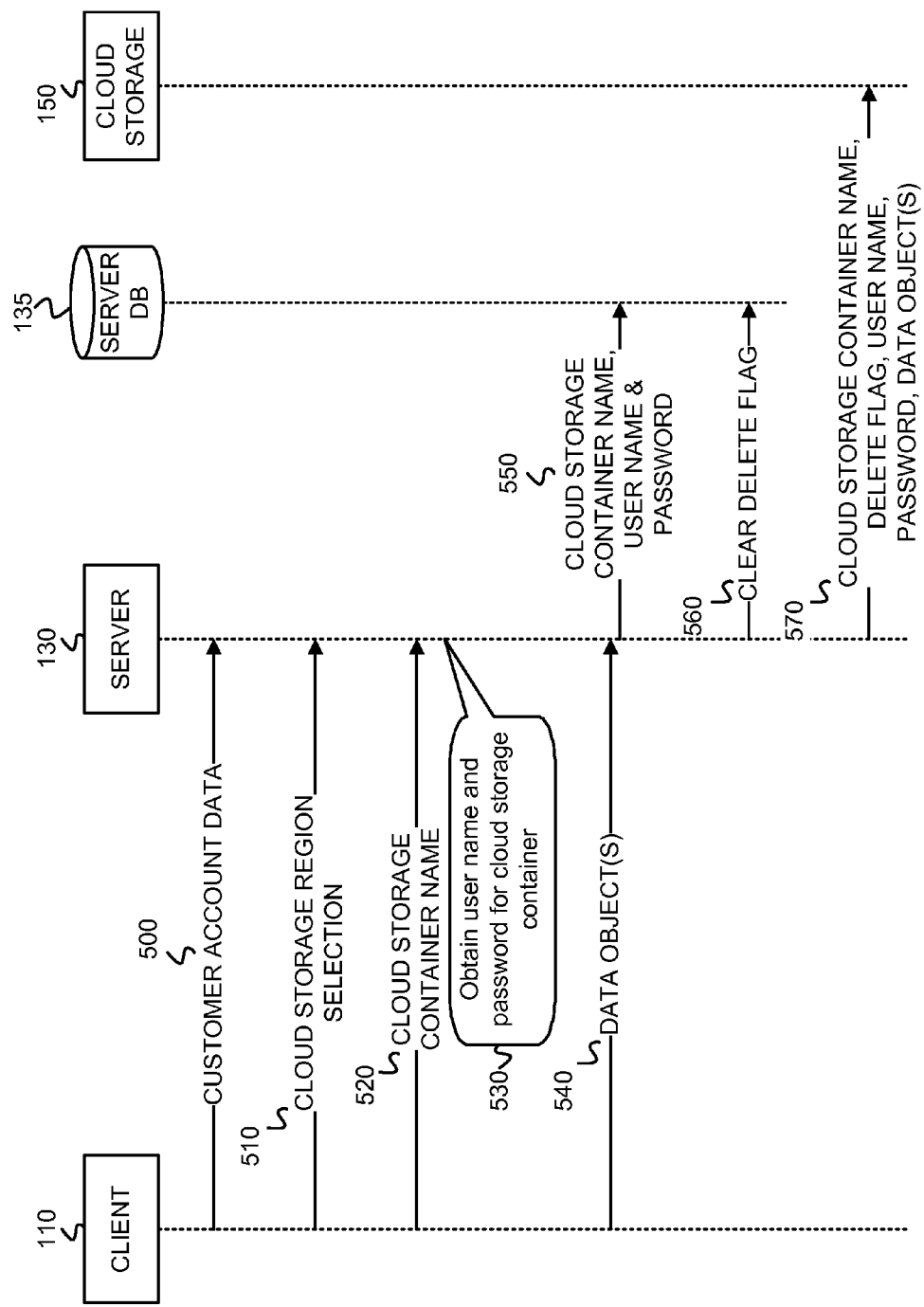
FIG. 5 is an exemplary messaging diagram associated with the exemplary process of FIG. 4.
Figure 6:
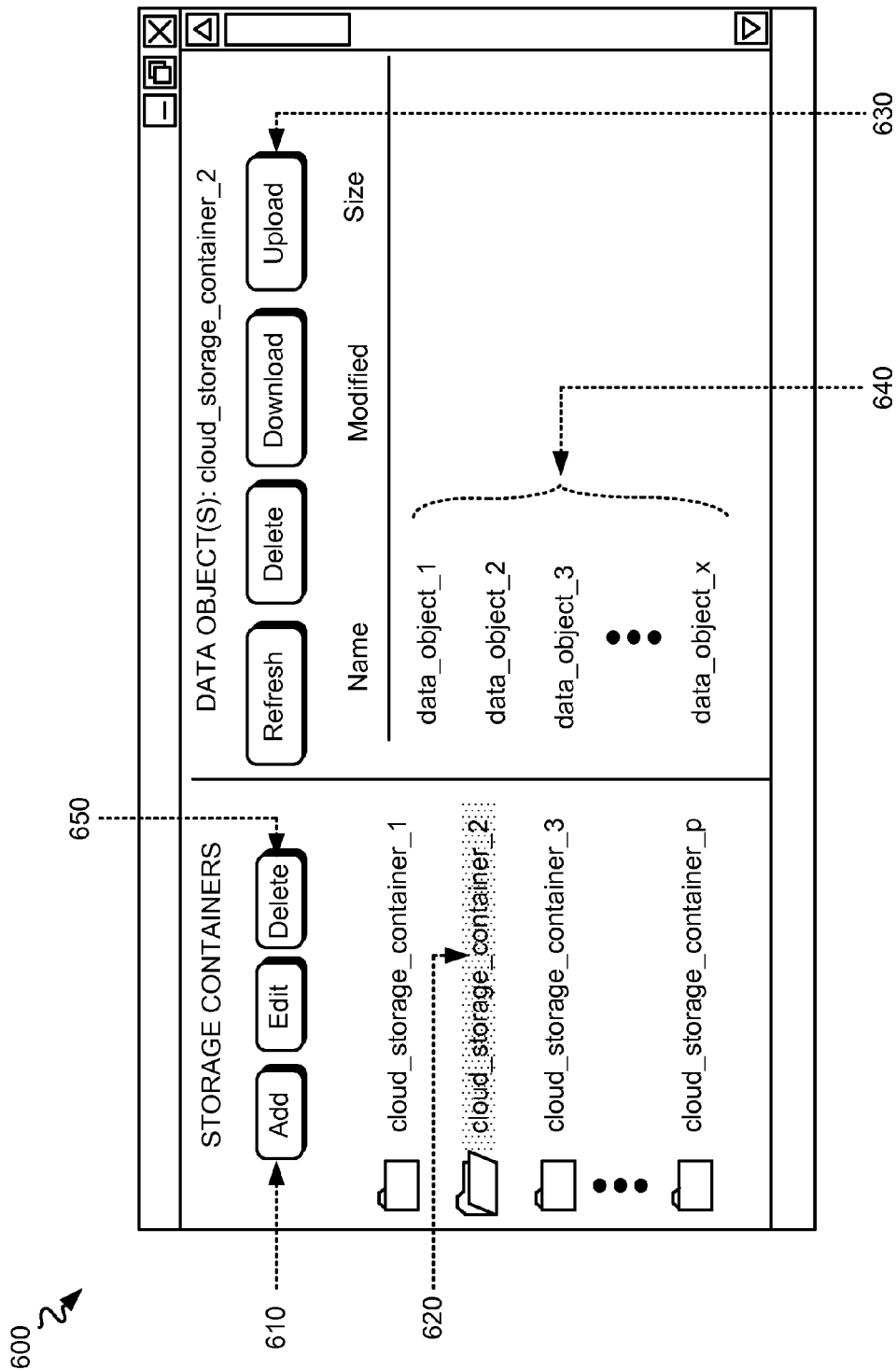
FIG. 6 is an exemplary user interface associated with the creation, use, and deletion of cloud storage containers.

The exemplary process may include receiving customer account data (block 400). Customer 170 may access server 130 with account data that identifies customer 170. For example, customer 170 may, via client 110 and network 120, send an account log-in to server 130. The messaging diagram of FIG. 5 depicts client 110 sending customer account data 500 to server 130. Server 130 may receive a selection of a cloud storage region (block 410). Cloud storage 140 may encompass multiple regions 160-1 through 160-$q$ (e.g., North America, Europe, Asia, etc.), and customer 170 may select the specific one of regions 160-1 through 160-$q$ in which customer 170 desires to create a cloud storage container, and to store certain data. FIG. 5 shows client 110 sending a cloud storage region selection 510 to server 130.

Server 130 may receive a name of a new cloud storage container (block 420). Customer 170 may create a name for the new cloud storage container (i.e., a unique identifier for the new cloud storage container) and submit it to server 130. FIG. 5 depicts client 110 sending a cloud storage container name 520 to server 130. As shown in the exemplary user interface 600 of FIG. 6, an add button 610 may be selected and a name 620 for a cloud storage container may be entered. Server 130 may obtain a user name and a password for the new cloud storage container (block 430). The user name and password combination may be unique for the new cloud storage container. The user name and password may be selected by customer 170, or may be generated by server 130. For example, in some implementations, server 130 may generate a token for the user name, and a secret key for the password. FIG. 5 depicts server 130 obtaining 530 a user name and password for the new cloud storage container.

Server 130 may receive one or more data objects for storage in the new cloud storage container (block 440). Customer 170 may retrieve and send, via client 110, a single data object, or multiple data objects, to server 130 for storage in cloud storage 140. FIG. 5 shows client 110 sending a data object(s) 540 to server 130. As shown in the exemplary user interface 600 of FIG. 6, an "upload" button 630 may be selected, and multiple data objects 640 may be uploaded into cloud storage container 620. Server 130 may store the cloud storage container name, and the user name and password in server DB 135 (block 450). FIG. 5 depicts server 130 sending a message 550 containing the cloud storage container name, and the user name and password, to server DB 135 for storage. Server 130 may send a message to server DB 135 to clear delete flag 230 associated with the cloud storage container (block 460). Server 130 may clear the delete flag to indicate that the new cloud storage container is not currently marked for deletion. FIG. 5 depicts server 130 sending a message 560 to server DB 135 instructing server DB 135 to clear the delete flag associated with the cloud storage container.

Server 130 may send the cloud storage container name, user name, password, and data object(s) to a cloud storage platform 150 in the selected cloud storage region 160 of cloud storage 140 (block 460). For example, server 130 may construct a packet, or similar data package, to include the named cloud storage container, the user name and password, and the data object(s), and then may send the constructed packet to a cloud storage platform 150. FIG. 5 depicts server 130 sending a message 570 containing the cloud storage container name, delete flag, user name, password, and data object(s) to cloud storage platform 150. Upon receipt, cloud storage platform 150 may store the received cloud storage container, delete flag, user name, password, and data object(s) for future access by customer 170.

The exemplary process of FIG. 4 has been described as being implemented by server 130. However, in some implementations, the exemplary process of FIG. 4 may be implemented, at least in part, by client 110 (e.g., API 180 of client 110).

Figure 7:
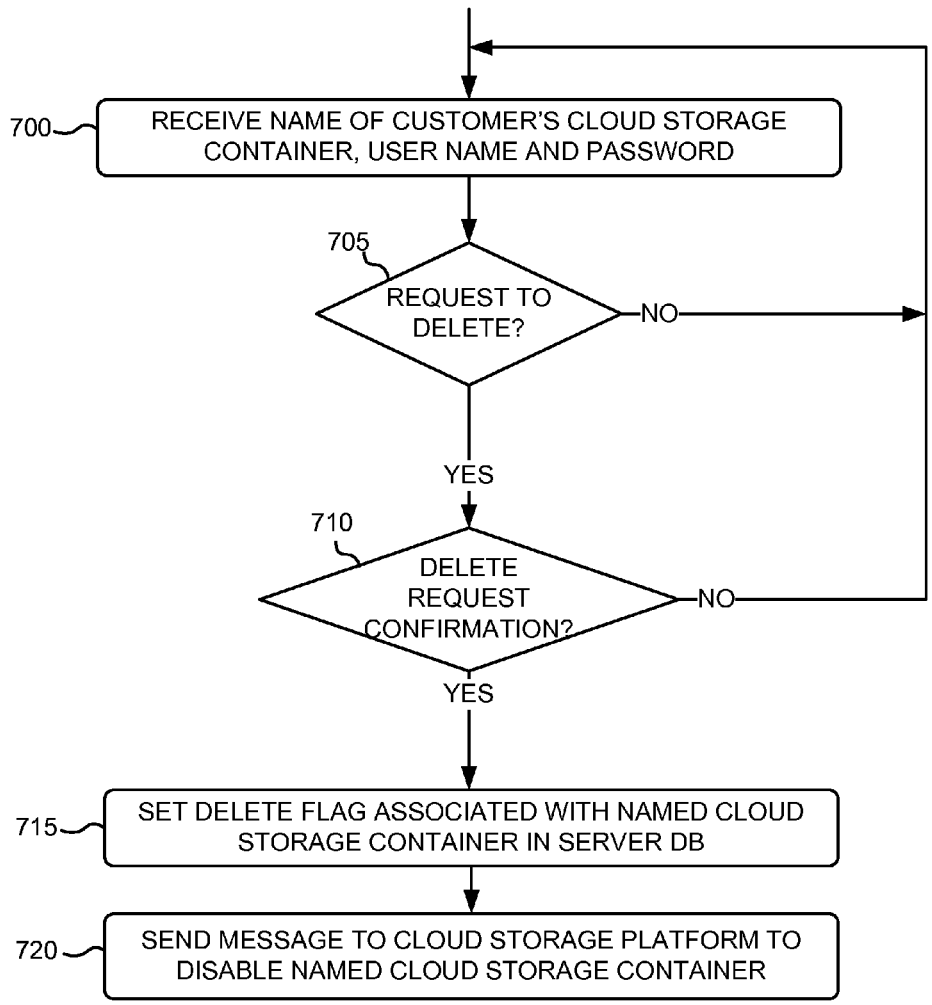
FIG. 7 is a flow diagram that illustrates an exemplary process for requesting deletion of a cloud storage container from a cloud storage region.

FIG. 7 is a flow diagram that illustrates an exemplary process for requesting deletion of a cloud storage container from a cloud storage region. The exemplary process of FIG. 7 may be implemented by server 130. The exemplary process of FIG. 7 is described below with reference to the exemplary messaging diagrams of FIG. 8 and the exemplary user interface of FIG. 6.

Figure 8:
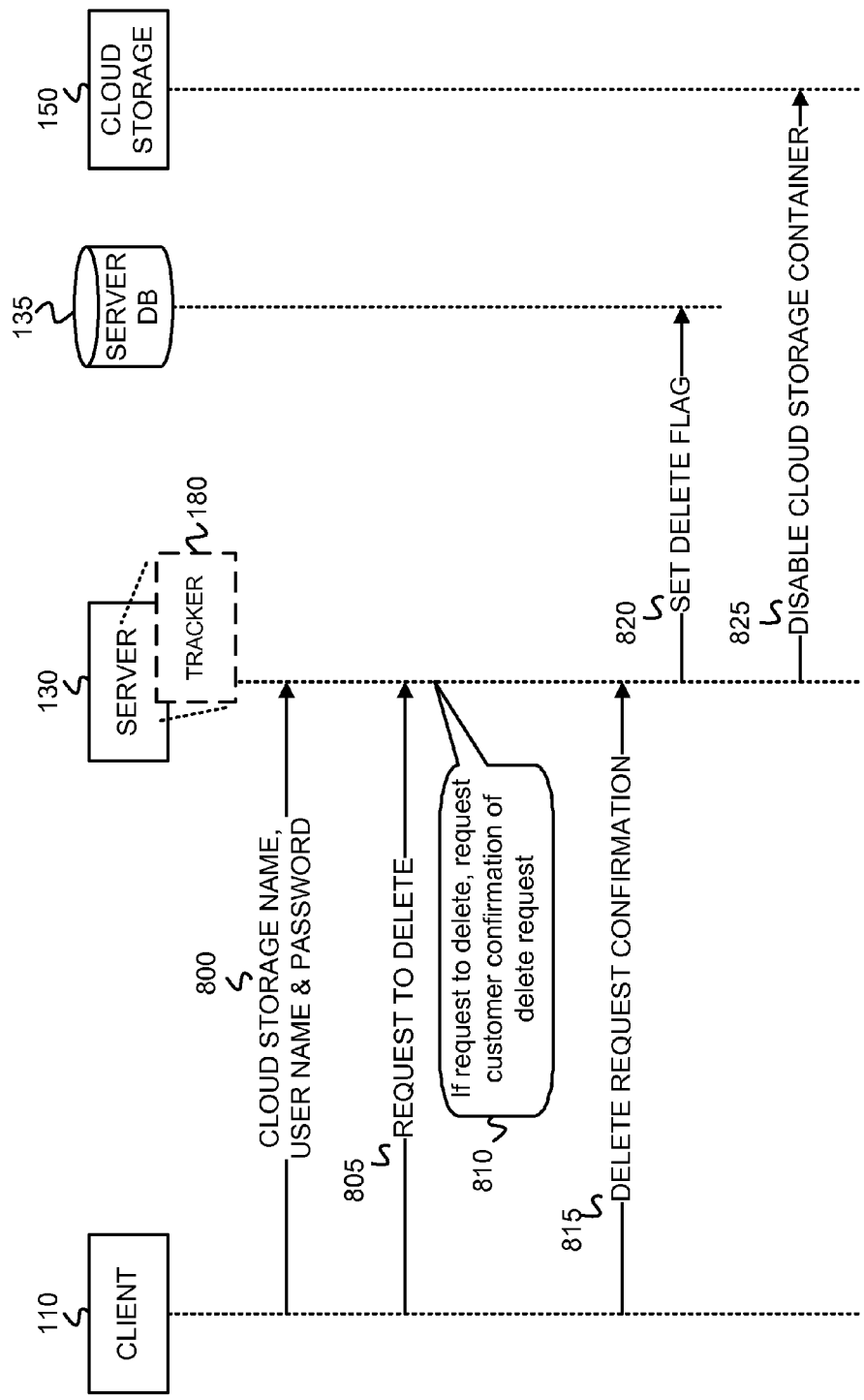
FIG. 8 is an exemplary messaging diagram associated with the exemplary process of FIG. 7.

The exemplary process may include receiving a name of the customer's cloud storage container, and the user name and password associated with the cloud storage container (block 700). Customer 170 may select the name of a previously created cloud storage container and supply the named cloud storage container to server 130 via client 110. FIG. 8 depicts client 110 sending a message 800 containing the cloud storage name, user name, and password to server 130. Referring to the exemplary user interface of FIG. 6, customer 170 may select and open a specific, named cloud storage container 620.

Server 130 may determine whether a request to delete has been received for the cloud storage container (block 705). Customer 170 at client 110 may request that the cloud storage container selected in block 700 be deleted. FIG. 8 shows client 110 sending a request to delete 805 to server 130. As shown in the exemplary user interface 600 of FIG. 6, a cloud storage container may be selected 620, and a "delete" button 650 may be selected to mark the cloud storage container for deletion.

If a request to delete has been received (YES—block 705), then server 130 may determine if confirmation of the delete request has been received (block 710). Client 110, or server 130, in response to the submission of a request to delete for the cloud storage selected in block 700, may request a confirmation from customer 170 that customer 170 actually wishes to delete the cloud storage container. FIG. 8 depicts server 130 requesting 810 customer confirmation of the delete request, and client 110 sending a delete request confirmation 815 to server 130 in response. If confirmation of the delete request has been received (YES—block 710), then server 130 may set delete flag 230 associated with the named cloud storage container in server DB 135 (block 715) and may send a message to cloud storage platform 150 to disable the named cloud storage container (block 720). As shown in FIG. 8, server 130 may send a message 820 to cloud storage platform 150 instructing cloud storage platform 150 to set the delete flag associated with the selected cloud storage container. In response to receipt of message 820, cloud storage platform 150 may set the delete flag associated with the named cloud storage container. As further shown in FIG. 8, server 130 may send a message 825 to cloud storage platform 150 to instruct cloud storage platform to disable the named cloud storage container.

Figure 9:
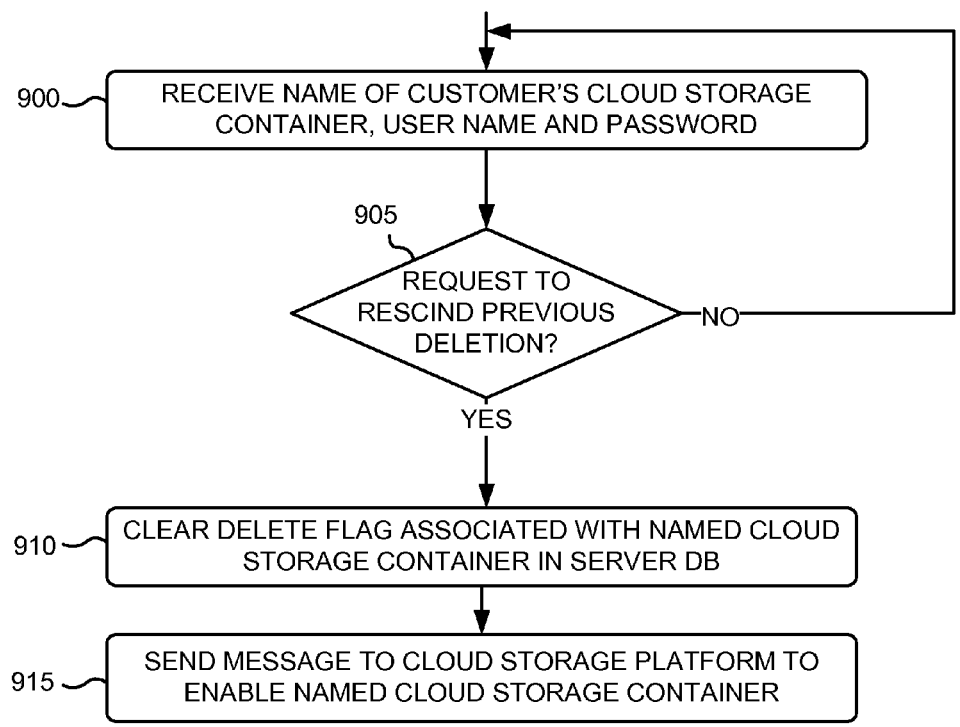
FIG. 9 is a flow diagram that illustrates an exemplary process for rescinding a previous customer request to delete a cloud storage container from a cloud storage region.

FIG. 9 is a flow diagram that illustrates an exemplary process for rescinding a previous customer request to delete a cloud storage container from a cloud storage region. The exemplary process of FIG. 9 may be implemented by server 130. The exemplary process of FIG. 9 is described below with reference to the exemplary messaging diagram of FIG. 10 and the exemplary user interface of FIG. 6.

The exemplary process may include receiving a name of the customer's cloud storage container, and the user name and password associated with the cloud storage container (block 900). Customer 170 may select the name of a cloud storage container previously requested to be deleted and supply the named cloud storage container to server 130 via client 110. FIG. 8 depicts client 110 sending a message 1000 containing the cloud storage name, user name, and password to server 130.

Server 130 may determine if a previous delete request for the named cloud storage container has been rescinded by the customer (block 905). Subsequent to submitting a delete request for a named cloud storage container, customer 170 may ascertain that they no longer wish to delete the named cloud storage container and, consequently, may attempt to rescind the delete request. In some implementations, customer 170 may attempt to rescind the delete request via client 110 or server 130. In other implementations, customer 170 may contact a help desk associated with the cloud storage service provide and request that the delete request be rescinded. The help desk operator may subsequently access server 130 to rescind the delete request.

Figure 10:
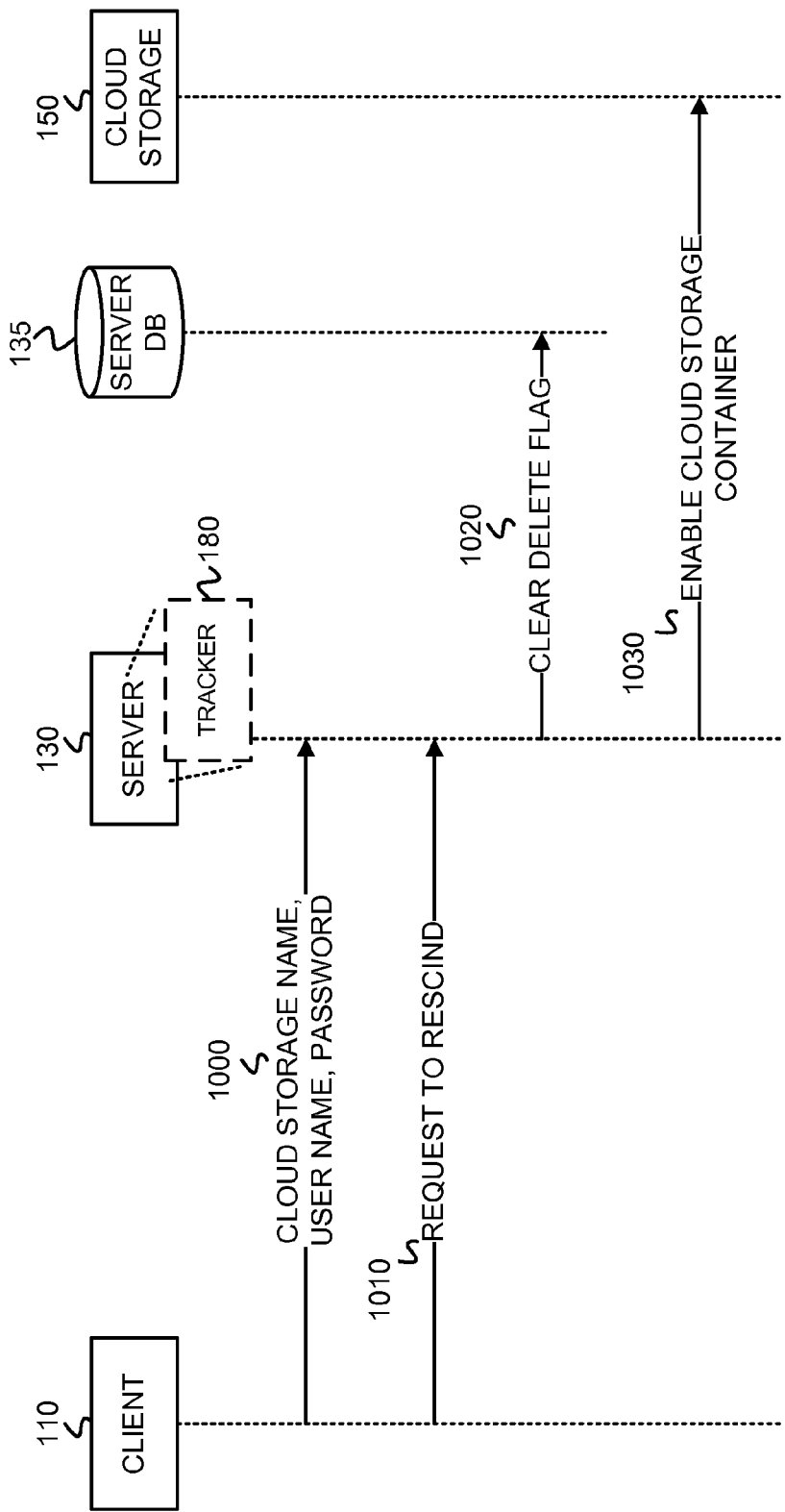
FIG. 10 is an exemplary messaging diagram associated with the exemplary process of FIG. 9.

Returning to block 725, if the delete request has been rescinded (YES—block 905), then server 130 may clear the delete flag associated with the cloud storage container in server DB 135 (block 910) and may send a message to cloud storage platform 150 to enable the named cloud storage container (block 740). Server 130 may additionally delete the date and time values stored in delete flag time field 240. FIG. 10 shows an exemplary implementation in which client 110 sends a message 1010 requesting that the previous delete request for the cloud storage container be rescinded. Server 130, in turn, sends a message 1020 to server DB 135 instructing server DB 135 to clear delete flag 230 associated with the cloud storage container, and deleting the date and time stored in delete flag time 240. In response to message 1020, server DB 135 may clear delete flag 230 associated with the cloud storage container. As further shown in FIG. 10, server 130 may send a message 1030 to cloud storage platform 150 instructing cloud storage platform 150 to enable the named cloud storage container.

The exemplary process of FIG. 9 has been described as being implemented by server 130. However, in some implementations, the exemplary process of FIG. 9 may be implemented, at least in part, by client 110 (e.g., by API 180 of client 110).

Figure 11:
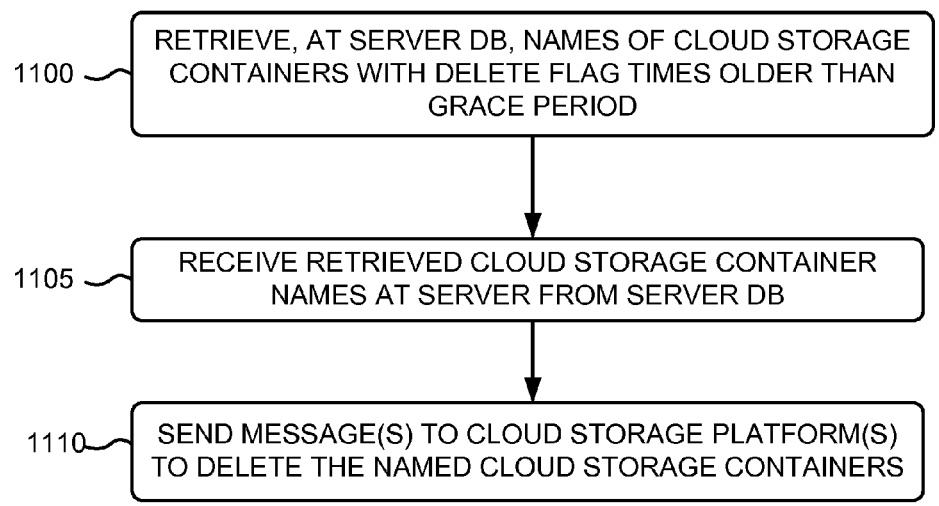
FIG. 11 is a flow diagram that illustrates an exemplary process associated with deleting cloud storage containers, and their contents, from cloud storage based on comparison of each cloud storage container's delete flag time with a configurable grace period.

FIG. 11 is a flow diagram that illustrates an exemplary process associated with deleting cloud storage containers, and their contents, from cloud storage based on comparison of each cloud storage container's delete flag time with a configurable grace period. The exemplary process of FIG. 11 may be implemented by server 130.

Figure 12:
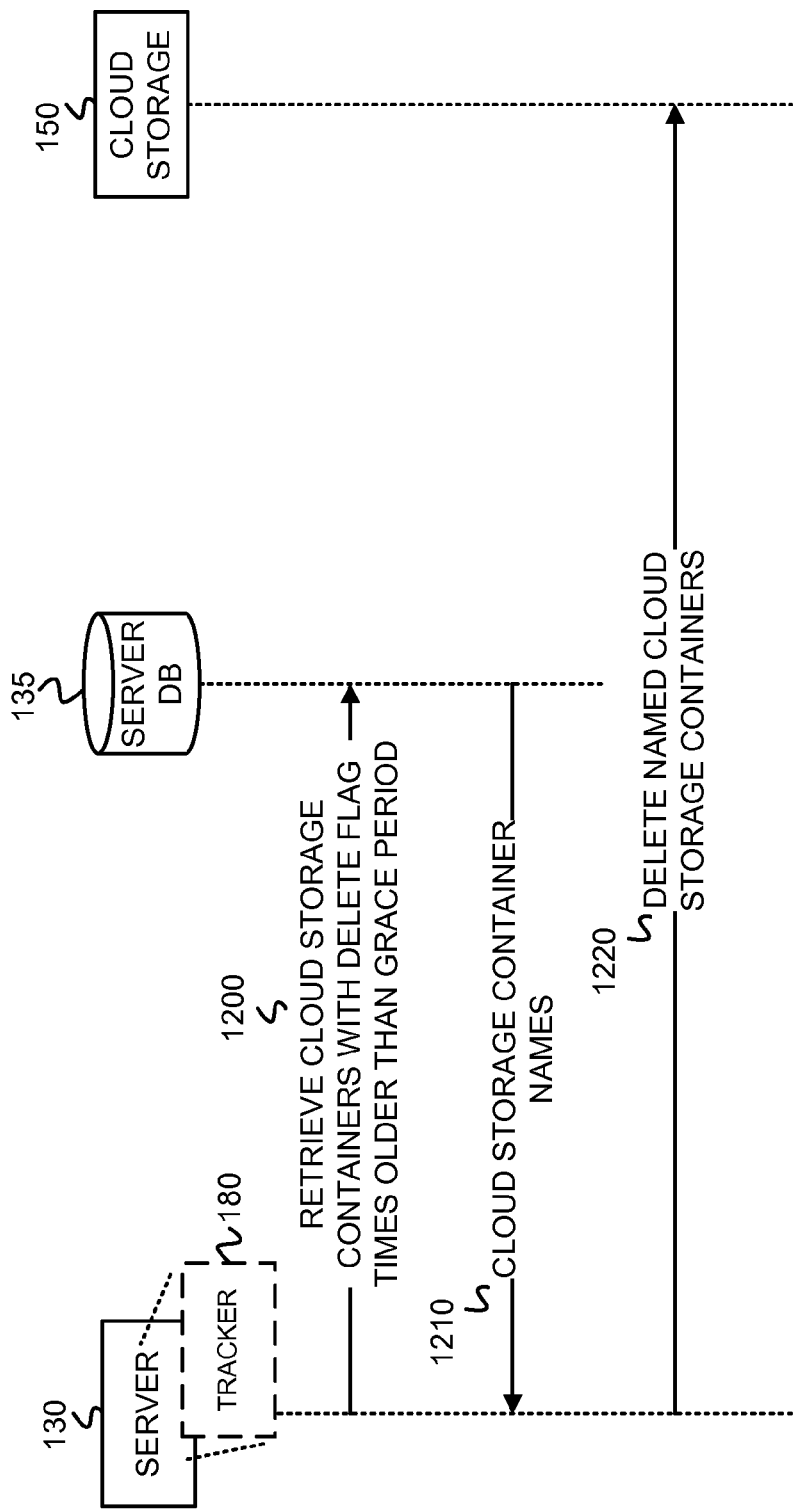
FIG. 12 is an exemplary messaging diagram associated with the exemplary process of FIG. 11.

The exemplary process may include retrieving, at server DB 135, the names of cloud storage containers with delete flag times older than a grace period (block 1100). The grace period may include a configurable period of time during which the customer may rescind the cloud storage container delete request without the cloud storage container, and the data object(s) stored within, being deleted. Server 130 may request the names of cloud storage containers, having delete flag times older than the grace period, from server DB 135. Server DB 135 may check each delete flag time field 240 stored in association with entries 200-1 through 200-p, and determine, based on a current date and time, whether the dates and times stored in each delete flag time field 240 exceed the grace period. The messaging diagram of FIG. 12 depicts tracker 180 of server 130 sending a message 120 to server DB 135 that instructs server DB 135 to retrieve cloud storage containers with delete flag times older than the grace period. Server 130 may receive the cloud storage container names retrieved by server DB 135 (block 1105). As shown in FIG. 12, upon receipt of message 1200, server DB 135 returns a message 1210 that contains the names of the cloud storage containers stored at server DB 135 having delete flag times 240 which, based on a current date and time, exceed the grace period.

Server 130 may send a message(s) to the cloud storage platform(s) to delete the named cloud storage containers retrieved in block 1105 (block 1110). FIG. 12 shows tracker 180 of server 130 sending a message 1220 that instructs cloud storage platform 150 to delete the cloud storage containers named in message 1220. Thus, cloud storage containers, having delete flag times older than the grace period, may be deleted if the customer has not rescinded the delete request prior at the expiration of the grace period. However, if the customer has rescinded a delete request (i.e., clearing delete flag 230 in block 910 of FIG. 9 and deleting any date and time values stored in delete flag time field 240), then the corresponding cloud storage container may not be caused to be deleted by server 130 in block 1110 of FIG. 11.

Figure 13:
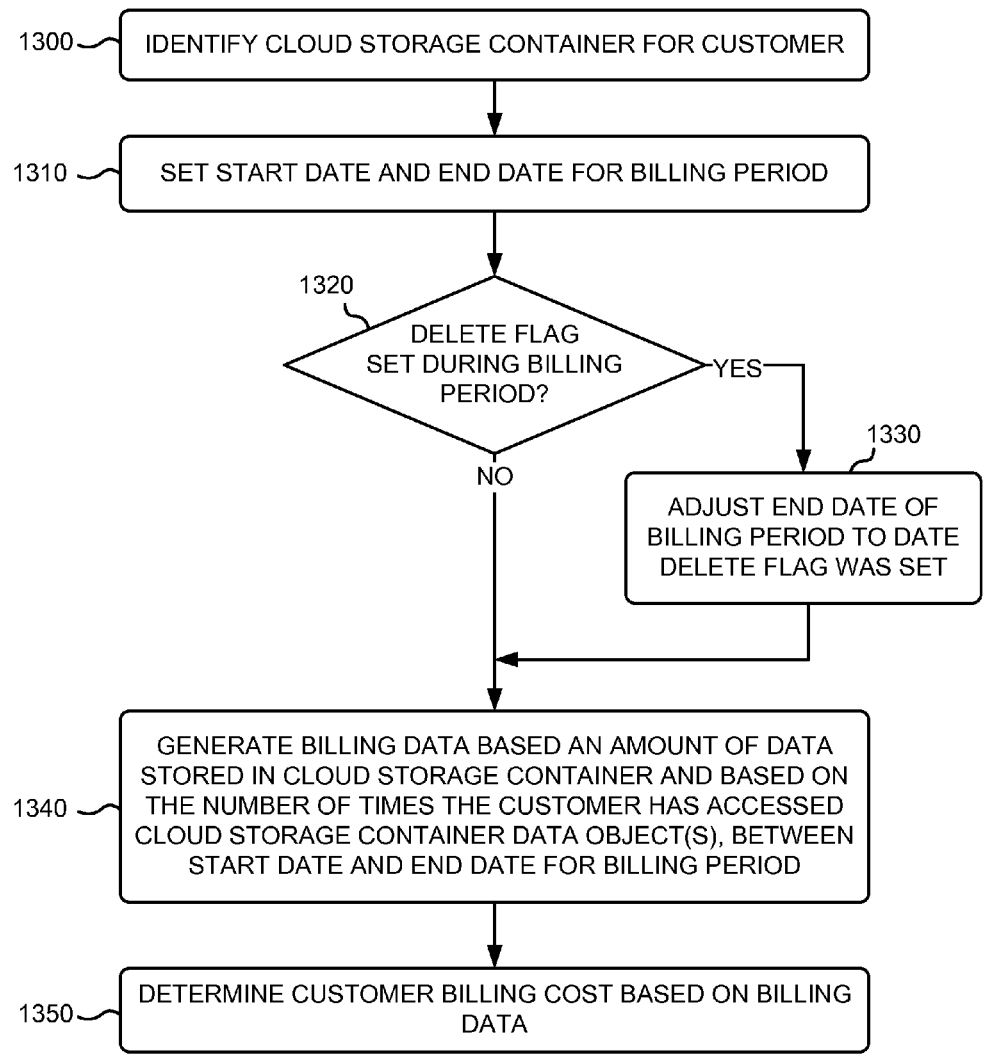
FIG. 13 is a flow diagram that illustrates an exemplary process associated with billing a customer for the creation and usage of a cloud storage container in a cloud storage region.

FIG. 13 is a flow diagram that illustrates an exemplary process associated with billing a customer for the creation and usage of a cloud storage container in a cloud storage region. The exemplary process of FIG. 13 may be implemented by server 130. The exemplary process of FIG. 13 may be executed for each cloud storage container for each customer storing data in cloud storage 140.

The exemplary process may include identifying a cloud storage container for a customer (block 1300). For a given customer, server 130 may identify each cloud storage container for generating billing data. Server 130 may set a start date and an end date for a billing period (block 1310). The start date and end date of the billing period may determine the relevant period over which the customer's usage of cloud storage 140 is identified and billed. Server 130 may determine if delete flag 230 for the cloud storage container identified in block 1300 was set during the billing period set in block 1310 (block 1320). If so (YES—block 1320), then server 130 may adjust the end date of the billing period to the date that delete flag 230 was set (block 1330). Server 130 may retrieve the contents of delete flag time field 240 to identify the date on which delete flag 230 was set. The exemplary process may continue at block 1340.

If delete flag 230 for the cloud storage container identified in block 1300 was not set during the billing period (NO—block 1320), then server 130 may generate billing data based on an amount of data stored in the cloud storage container and based on the number of times the customer has accessed the cloud storage container, between the start data and the end date for the billing period (block 1340). Server 130 and/or cloud storage platforms 150-1 through 150-m may maintain logs of the amount of data stored in the cloud storage container, and the number of times that customer 170 accessed the cloud storage container. Server 130 may generate the billing data based on these logs.

Server 130 may determine the customer billing cost based on the billing data generated in block 1340 (block 1350). Server 130 may apply specific billing rates to both the amount of data stored in the cloud storage container, and the number of times that customer 170 accessed data in the cloud storage container. For example, server 130 may apply a specific dollar amount per each megabyte of data stored in the cloud storage container, and a specific dollar amount for each time customer 170 accessed the data in the cloud storage container. The customer billing cost may be subsequently provided to customer 170 in electronic or hard copy format.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 7, 9, 11 and 13 the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a network device, the method comprising:

creating a plurality of cloud storage containers in multiple cloud storage platforms in multiple regions of cloud storage;

storing, in a database, entries associated with each of the plurality of cloud storage containers, wherein each entry comprises a field indicating a name of a cloud storage container, a delete flag field, and a delete flag time field;

receiving requests to delete selected first ones of the plurality of cloud storage containers;

setting the delete flag fields associated with the selected first ones of the plurality of cloud storage containers indicating that the requests have been received to delete the selected first ones of the plurality of cloud storage containers;

storing timestamps in the delete flag time fields associated with the selected first ones of the plurality of cloud storage containers indicating times when the associated delete flag fields were set, wherein the timestamps are deleted if the corresponding delete flag fields are cleared;

comparing, the timestamps, stored in the database, to a current date and time to determine whether any of the cloud storage containers have associated timestamps that are older than a grace period;

retrieving, from the database, names of multiple ones of the selected first ones of the plurality of cloud storage containers having timestamps that are older than the grace period; and sending at least one message to at least one of the multiple cloud storage platforms to delete the multiple ones of the selected first ones of the plurality of cloud storage containers that correspond to the retrieved names.

2. The method of claim 1, wherein the grace period comprises a configurable time period.

3. The method of claim 1, further comprising:
disabling the selected first ones of the plurality of cloud storage containers based on receiving the requests to delete the selected first ones of the plurality of cloud storage containers, wherein disabling the selected first ones of the plurality of cloud storage containers comprises disallowing access to the selected first ones of the plurality of cloud storage containers.

4. The method of claim 3, further comprising:
obtaining confirmation of the requests to delete the selected first ones of the plurality of first cloud storage containers prior to disabling the selected first ones of the plurality of cloud storage containers.

5. The method of claim 1, wherein creating each of the plurality of cloud storage containers in the multiple cloud storage platforms in the multiple regions of the cloud storage comprises:
receiving selection of a cloud storage region from the multiple regions;
receiving a name of a respective one of the plurality of storage containers; and
obtaining a user name and password for the respective one of the plurality of cloud storage containers.

6. The method of claim 1, wherein each of the multiple regions of the cloud storage comprises a different geographic region within a network.

7. A device, comprising:
a communication interface coupled to a network; and
a processing unit configured to:
create, via the communication interface, a plurality of cloud storage containers in multiple cloud storage platforms in multiple regions of cloud storage,
store, in a database, entries associated with each of the plurality of cloud storage containers, wherein each entry comprises a field indicating a name of a cloud storage container, a delete flag field, and a delete flag time field,
receive, via the communication interface, requests to delete selected first ones of the plurality of cloud storage containers,
set the delete flag fields associated with the selected first ones of the plurality of cloud storage containers indicating that the requests have been received to delete the selected first ones of the plurality of cloud storage containers,
store timestamps in the delete flag time fields associated with the selected first ones of the plurality of cloud storage containers indicating times when the associated delete flag fields were set, wherein the timestamps are deleted if the corresponding delete flag fields are cleared,
compare the timestamps, stored in the database, to a current date and time to determine whether any of the cloud storage containers have associated timestamps that are older than a grace period,
retrieve, from the database, names of multiple ones of the selected first ones of the plurality of cloud storage containers having associated timestamps that are older than the grace period, and
send at least one message to at least one of the multiple cloud storage platforms to delete the multiple ones of the selected first ones of the plurality of cloud storage containers that correspond to the retrieved names.

8. The device of claim 7, wherein the grace period comprises a configurable time period.

9. The device of claim 7, wherein the processing unit is further configured to:
disable the selected first ones of the plurality of cloud storage containers based on receiving the requests to delete the selected first ones of the plurality of cloud storage containers, wherein disabling the selected first ones of the plurality of cloud storage containers comprises disallowing access to the selected first ones of the plurality of cloud storage containers.

10. The device of claim 9, wherein the processing unit is further configured to:
obtain confirmation of the requests to delete the selected first ones of the plurality of first cloud storage containers prior to disabling the selected first ones of the plurality of cloud storage containers.

11. The device of claim 7, wherein, when creating each of the plurality of cloud storage containers in the multiple cloud storage platforms in the multiple regions of cloud storage, the processing unit is further configured to:
receive selection of a cloud storage region from the multiple regions;
receive a name of a respective one of the plurality of storage containers; and
obtain a user name and password for the respective one of the plurality of cloud storage containers.

12. The device of claim 7, wherein each of the multiple regions of the cloud storage comprises a different geographic region within a network.

13. A non-transitory computer-readable medium storing one or more instructions, the one or more instructions comprising:
one or more instructions that, when executed by a processor, cause the processor to:
create a plurality of cloud storage containers in multiple cloud storage platforms in multiple regions of cloud storage,
store, in a database, entries associated with each of the plurality of cloud storage containers, wherein each entry comprises a field indicating a name of a cloud storage container, a delete flag field, and a delete flag time field,
receive requests to delete selected first ones of the plurality of cloud storage containers, set the delete flag fields associated with the selected first ones of the plurality of cloud storage containers indicating that the requests have been received to delete the selected first ones of the plurality of cloud storage containers, store timestamps in the delete flag time fields associated with the selected first ones of the plurality of cloud storage containers indicating times when the associated delete flag fields were set, wherein the timestamps are deleted if the corresponding delete flag fields are cleared, compare the timestamps, stored in the database, to a current date and time to determine whether any of the cloud storage containers have associated timestamps that are older than a grace period, retrieve, from the database, names of multiple of the selected first ones of the plurality of cloud storage containers having associated timestamps that are older than the grace period, and send at least one message to at least one of the multiple cloud storage platforms to delete the multiple of the selected first ones of the plurality of cloud storage containers that correspond to the retrieved names.

14. The non-transitory computer-readable medium of claim 13, wherein the grace period comprises a configurable time period.

15. The non-transitory computer-readable medium of claim 13, wherein the one or more instructions further comprise:

one or more instructions that cause the processor to disable the selected first ones of the plurality of cloud storage containers based on receiving the requests to delete the selected first ones of the plurality of cloud storage containers, wherein disabling the selected first ones of the plurality of cloud storage containers comprises disallowing access to the selected first ones of the plurality of cloud storage containers.

16. The non-transitory computer-readable medium of claim 15, wherein the one or more instructions further comprise:

one or more instructions that cause the processor to obtain confirmation of the requests to delete the selected first ones of the plurality of first cloud storage containers prior to disabling the selected first ones of the plurality of cloud storage containers.

17. The non-transitory computer-readable medium of claim 13, wherein the one or more instructions that cause the processor to create each of the plurality of cloud storage containers in the multiple cloud storage platforms in the multiple regions of cloud storage further comprise:

one or more instructions that cause the processor to:
receive selection of a cloud storage region from the multiple regions;
receive a name of a respective one of the plurality of storage containers; and
obtain a user name and password for the respective one of the plurality of cloud storage containers.

18. The non-transitory computer-readable medium of claim 13, wherein each of the multiple regions of the cloud storage comprises a different geographic region within a network.

* * * * *